(12) United States Patent
Zhou et al.

(10) Patent No.: US 6,426,949 B1
(45) Date of Patent: Jul. 30, 2002

(54) SIGNAL RECEPTION APPARATUS FOR DS-CDMA COMMUNICATION SYSTEM

(75) Inventors: Changming Zhou; Xuping Zhou, both of Tokyo; Mamoru Sawahashi; Fumiyuki Adachi, both of Yokohama, all of (JP)

(73) Assignees: Yozan, Inc.; NTT Mobile Communication Network, Inc., both of Tokyo (JP)

( * ) Notice: Subject to any disclaimer, the term of this patent is extended or adjusted under 35 U.S.C. 154(b) by 0 days.

(21) Appl. No.: 09/098,357

(22) Filed: Jun. 17, 1998

(30) Foreign Application Priority Data

Jun. 18, 1997 (JP) ............................................... 9-176609

(51) Int. Cl.[7] .......................... H04B 7/216; H04B 15/00
(52) U.S. Cl. ......................... 370/342; 370/350; 375/140
(58) Field of Search ................................. 370/320, 335, 370/342, 350, 503; 375/130, 140, 143, 144, 148, 150, 267, 152, 347, 142, 149, 365, 368, 375, 344; 455/504, 63, 67.3, 67.6

(56) References Cited

U.S. PATENT DOCUMENTS

| | | | |
|---|---|---|---|
| 5,412,686 A | * 5/1995 | Ling | 375/200 |
| 5,659,573 A | * 8/1997 | Bruckert et al. | 370/200 |
| 5,666,352 A | * 9/1997 | Ohgoshi et al. | 370/206 |
| 5,694,388 A | * 12/1997 | Sawahashi et al. | 370/206 |
| 6,009,074 A | * 12/1999 | Kim et al. | 370/209 |
| 6,038,250 A | * 3/2000 | Shou et al. | 370/342 |
| 6,134,262 A | * 10/2000 | Kitade et al. | 375/142 |

* cited by examiner

*Primary Examiner*—Chau Nguyen
*Assistant Examiner*—Andy Lee
(74) *Attorney, Agent, or Firm*—Armstrong, Westerman & Hattori, LLP (57) ABSTRACT

A signal reception apparatus for DS-CDMA communication system having a complex matched filter for despreading a received signal into I- and Q-components $D_i$ and $D_q$ of despread signal. $D_j$ and $D_q$ are input to a path selection portion 13 for extracting a phase error in a pilot symbol block of the despread signal. A phase compensation signal is calculated according to the phase error in the portion 13. An information symbol is compensated according to the phase compensation signal. An electrical power is calculated from an average of the phase compensation signal of several slots for selecting paths to be received. The selected paths are combined with phase synchronized by a rake combiner 14.

6 Claims, 5 Drawing Sheets

SIGNAL RECEPTION APPARATUS FOR DS-CDMA COMMUNICATION SYSTEM

BACKGROUND OF THE INVENTION

1. Field of the Invention

The present invention relates to a signal reception apparatus for DS-CDMA communication system, particularly to a take receiver for combining multi-path signals with phase compensation.

2. Prior Art

A spread spectrum communication system absorbs attention due to its high frequency efficiency as the users of the land mobile communication steeply increases. Among various types of spread spectrum communication, a direct sequence code division multiple access (DS-CDMA) communication system is going to be standardized by an international committee of communication, mainly in the field of the mobile cellular radio and wireless LAN.

Usually, one signal transmitted causes a plurality of propagation signals passing through different paths with different path lengths. Since these signals cannot be coherently added, a multi-path fading occurs. In the DS-CDMA system, the multi-path signal are resolved and utilized by combining them.

Figure 7A:
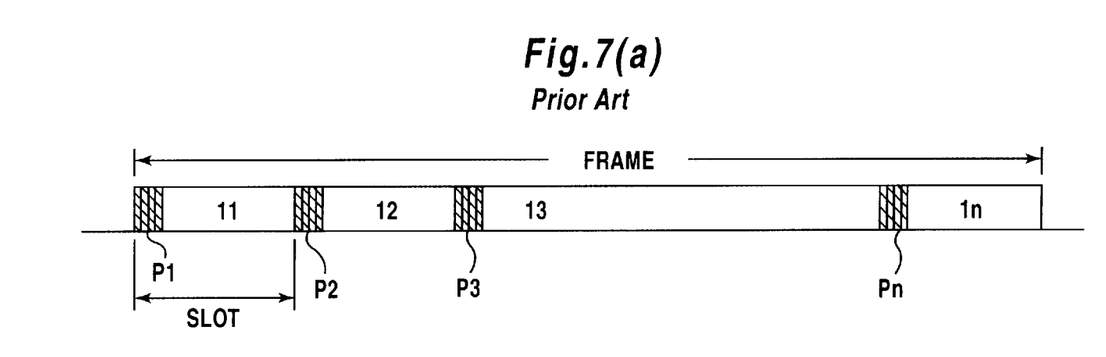
FIG. 7(a) is a diagram showing a frame format of a signal to be transmitted.

FIG. 7(a) shows an example of the frame format in the DS-CDMA system. Each frame consists of a plurality of slots, for example, 6 slots. Each slot consists of a pilot symbol block and a information symbol block. Each of the pilot symbol blocks P1, P2, . . . , Pn has a predetermined number of symbols, for example, 4 symbols, and includes a predetermined symbol sequence. Each of the information symbol blocks I1, I2, . . . , In has a predetermined number of symbols, for example, 36 symbols. The pilot symbol blocks and information symbol blocks are arranged one after another so that each information symbol block follows one pilot symbol block.

Symbol blocks are modulated by QPSK information modulation, and modulated by BPSK spreading modulation or QPSK spreading modulation, then transmitted.

A composite code is formed by composing a short code with a length equal to the symbol duration and a long code with length equal to multiple symbol duration.

Figure 7B:
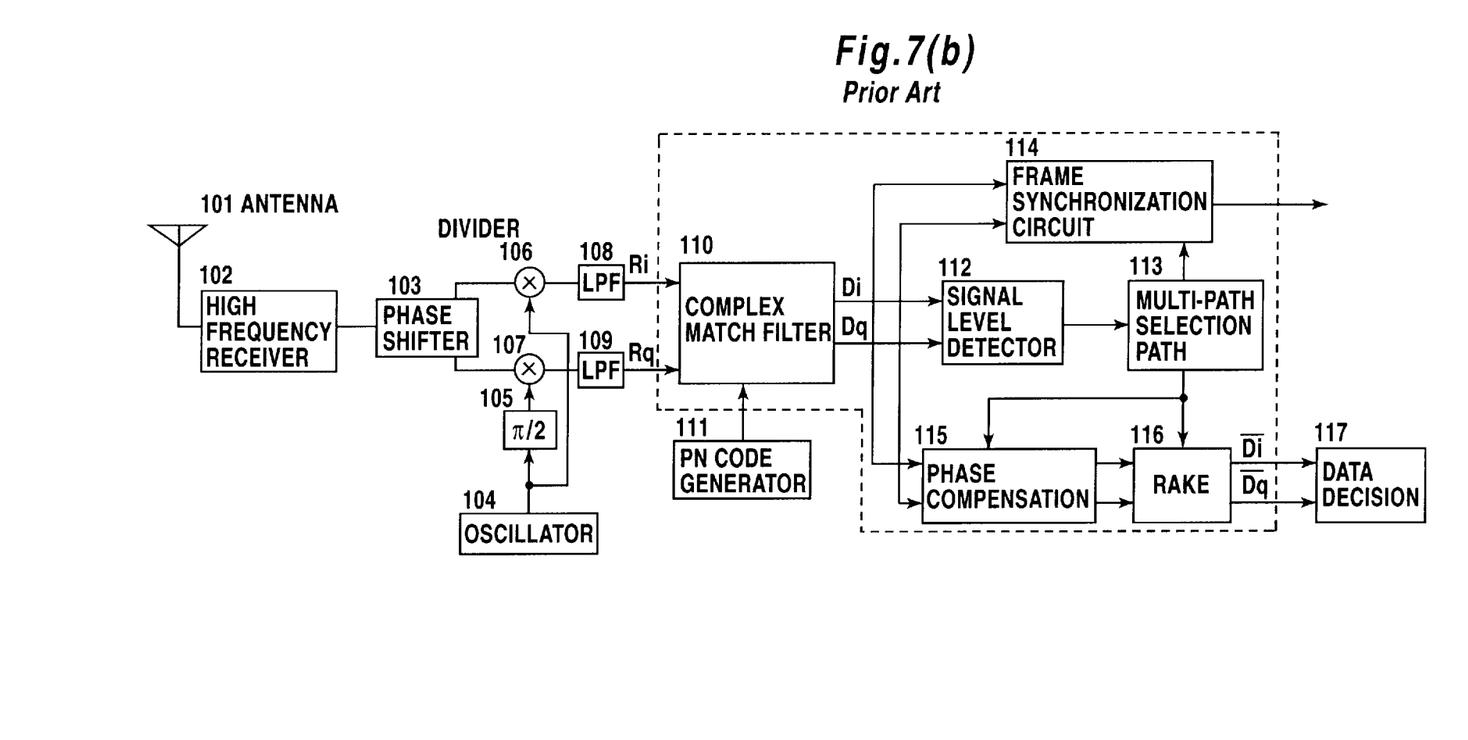
FIG. 7(b) is a block diagram of a conventional rake receiver.

FIG. 7(b) shows a conventional rake receiver. The signal received by an antenna 101 is converted into a intermediate frequency signal by a high frequency receiver portion 102. An output of the portion 103 is divided by a divider 103 into two components of in-phase component (I-component) and quadrature component (Q-component) to be input to multipliers 106 and 107, respectively. A wave of a local frequency is generated by an oscillator 104. The wave is input directly to the multiplier 106, and is input through a phase shifter 105 for shifting the wave in phase by $\pi/2$ to the multiplier 107. The multiplier 106 multiplies the intermediate frequency signal from the divider 103 by the wave from the oscillator 104. An output of the multiplier 106 is processed by a low-pass filter 108 so that the I-component base band signal Ri is generated. The multiplier 107 multiplies the intermediate frequency signal from the divider 104 by the wave from the phase shifter 105. An output of the multiplier 107 is processed by a low-pass filter 109 so that the Q-component base band signal Rq is generated. The quadrature detection is performed.

The base band signal Ri and Rq are input to a complex matched filter 110 for multiplying the base band signal by I- and Q-components of PN code sequence supplied from a PN code generator 111. This is despreading. The I- and Q-components Di and Dq of the output of the matched filter 110 are input to a signal level detector 112, frame synchronization circuit 114 and a phase compensation portion 115.

The signal level detector 112 calculates the power of received signal Di and Dq. The signal power level is input to a multi-path selection portion 113 for selecting N paths, for example 4 paths, which are with higher power level of than others.

The frame synchronization circuit 114 receives an information of the path with maximal power from the multi-path selection portion 113 for detecting the head of the frame according to the symbol pattern of the pilot symbol block.

An output of the multi-path selection portion 113 is input to the phase compensation portion 115 which compensates the phase of the selected paths for example up to 4 paths. The outputs are synchronized and combined by a rake combiner 116. Using the output of rake combinent 116, a decision is made by data decision portion 117 and the information symbol is recovered.

As mentioned above, the phase of the despread received complex signal are compensated by the portion 115 according to the phase rotation of the known pilot symbol in the received signal. This is necessary for the coherent detection because the absolute phase is needed in the coherent detection.

Figure 8:
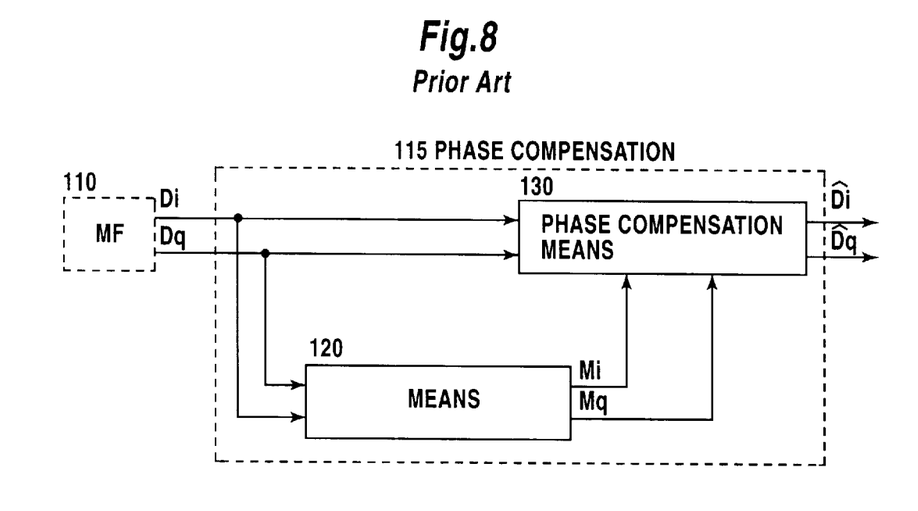
FIG. 8 is a block diagram of a conventional phase compensation means.

FIG. 8 shows the phase compensation portion 115. The despread pilot symbol Di and Dq output from the complex matched filter 110 is input to a means 120 for extracting and averaging the phase error in Di and Dq.

A compensation signal is output from the means 120 to a phase compensation means 130. The means 130 multiplies the despread information symbol block by the compensation signal so as to compensate the phase of Di and Dq.

When a pilot symbol transmitted is expressed as a complex $a = a_i + j\, a_q$ and the pilot symbol received is $P = P_i + j\, P_q$, "a" and "P" are different only in phase θ by ignoring the difference between the amplitudes, as shown in the formula (1).

$$P = P_i + j \cdot P_q = (a_i + j \cdot a_q) \cdot e^{j\theta} \tag{1}$$

As shown in the formula (2), the phase of the pilot symbol P is extracted by multiplying "P" by a conjugate complex of "a". (Pi, Pq) of the pilot symbol is called "phase vector", hereinafter.

$$\begin{aligned} ev &= (P_i + j \cdot P_q)(a_i + j \cdot a_q) \\ &= (P_i \cdot a_i + P_q \cdot a_q) + j \cdot (P_q \cdot a_i - P_i \cdot a_q) \\ &= e^{j\theta} \end{aligned} \tag{2}$$

The average phase error of the pilot symbol is expressed by the formula (3).

$$\begin{aligned} E &= \frac{1}{L} \sum_{k=1}^{L} (P_i^k + j \cdot P_q^k) \cdot (a_i^k - j \cdot a_q^k) \\ &= P_q + j \cdot P_q \end{aligned} \tag{3}$$

Here, "L" is the total number of symbols included within one pilot symbol block. L=4 for example. The upper letter "k" is an ordinal number of the pilot symbol. (Ei, Ej) is called "error vector", hereinafter.

Usually, the pilot symbol $a = a_i + j\, a_q$ is with $a_i = (-1, +1)$ and $a_q = (-1, +1)$. So the multiplication in the formula (2) can be implemented by controlling positive and negative sign of the received pilot symbol. The phase error E in the pilot symbol block can be calculated by an adder. Therefore, the calculation is executed by a simple circuit.

There are two methods for phase compensation using the average phase error of the pilot symbol.

Figure 9A:
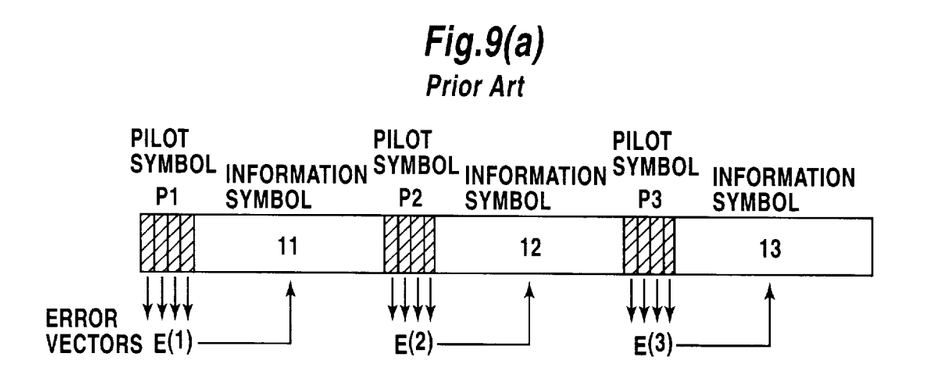
FIG. 9 is a diagram of a frame format showing the phase compensation.

FIG. 9(a) shows the first method of phase compensation. The information symbols I1, I2 and I3 are compensated by the phase error vectors $E^{(1)}$, $E^{(2)}$ and $E^{(3)}$ just before the information symbols, respectively. This method can be called extrapolating compensation. The first pilot symbol blocks P1 and the first information symbol block I1 are representatively described.

A vector for compensating the phase error of the pilot symbol block in each path can be calculated by the formulae (4) to (6). The vector (Mi, Mq) for the compensation is called "compensation vector", hereinafter.

$$M = M_i + j \cdot M_q \quad (4)$$

$$M_i = E_i \quad (5)$$

$$M_q = E_q \quad (6)$$

The received symbol $D = D_i + j\, D_q$ is multiplied by a conjugate complex of the compensation vector M as shown in the formula (7) so that the information symbol block in the slot is compensated in phase. A compensated received signal is expressed by Dhat (D with a symbol like a hat).

$$\hat{D} = (D_i + j \cdot D_q) \cdot (M_i - j \cdot M_q) \quad (7)$$
$$= (D_i M_i + D_q M_q) + j \cdot (D_q M_i - D_i M_q)$$

Other paths selected by the portion 113 of the multi-path signal is similarly processed.

The rake combiner synchronizes the compensated signals and combines them. The output of the rake combiner is shown in the formulae (8) and (9). The output is expressed by Dbar (D with a symbol bar).

$$\overline{D}_i = \sum_{n=1}^{N} \hat{D}_i^{(n)} \quad (8)$$

$$\overline{D}_q = \sum_{n=1}^{N} \hat{D}_q^{(n)} \quad (9)$$

where, the superior (n) show the ordinal number of the path n=1, 2, ..., N, and N=4 for example.

Figure 9B:
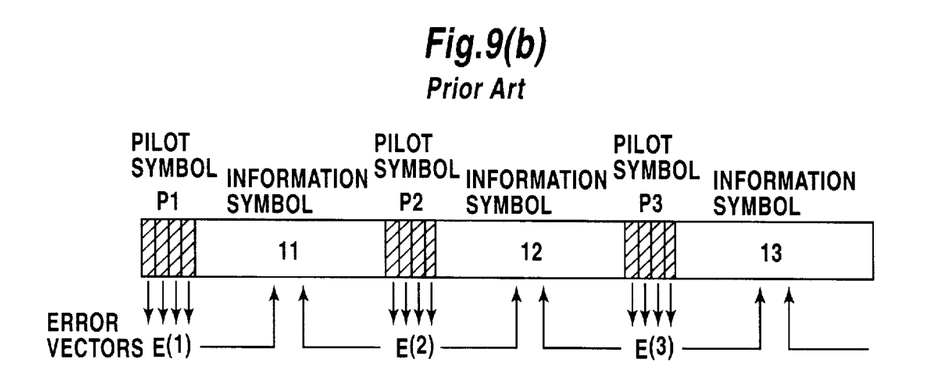

FIG. 9(b) shows the second method of phase compensation. The information symbols I1, I2 and I3 are compensated by pairs of the phase error vectors $E^{(1)}$ and $E^{(2)}$, $E^{(2)}$ and $E^{(3)}$, and $E^{(3)}$ and $E^{(4)}$ just before and behind each information symbol, respectively. This method can be called interpolating compensation. The first pilot symbol block P1 and the first information symbol block I1 are representatively described. When one pilot symbol block consists of 4 symbols, 36 symbols of one information symbol block is compensated by an average phase errors of 8 symbols of successive two pilot symbol blocks.

An error vector averaged over 4 pilot symbols is output from the means 120 as shown in the formulae (10) and (11).

$$E^{(t)} = E_i^{(t)} + j \cdot E_q^{(t)} \quad (10)$$

$$E^{(t+1)} = E_i^{(t+1)} + j \cdot E_q^{(t+1)} \quad (11)$$

The compensation vector M is calculated as in the formulae (12) and (13).

$$M_i = (E_i^{(t)} + E_i^{(t+1)})/2 \quad (12)$$

$$M_q = (E_q^{(t)} + E_q^{(t+1)})/2 \quad (13)$$

The mean between the averaged error vector $E^{(t)}$ just before the information symbol block Ii and the averaged error vector $E^{(t+1)}$ just behind Ii is used as a compensation vector M. The received vector $D = D_i + j\, D_q$ is multiplied by a conjugate vector of M so that Ii between $E^{(t)}$ and $E^{(t+1)}$ is compensated in phase.

The second method is higher accuracy than the first method, however a delay circuit such as a memory is necessary for holding one information symbol block until one phase error signal is calculated.

The path selection portion 113 calculates the electrical power from the despread signal as shown in the formula (14). An influence of interference and noise is included in the power.

$$|D| = \sqrt{D_i^2 + D_q^2} \quad (14)$$

The power is always positive in despite of the despread signal. The peak value is not so much higher than other values when a plurality of symbols are averaged.

SUMMARY OF THE INVENTION

The present invention is invented so as to solve the conventional problems and has an object to provide a signal reception apparatus for DS-CDMA communication system.

According to the present invention, the signal reception apparatus calculates the power of phase corrected signal for reducing the influence of nosie and interference.

PREFERRED EMBODIMENT

Figure 1:
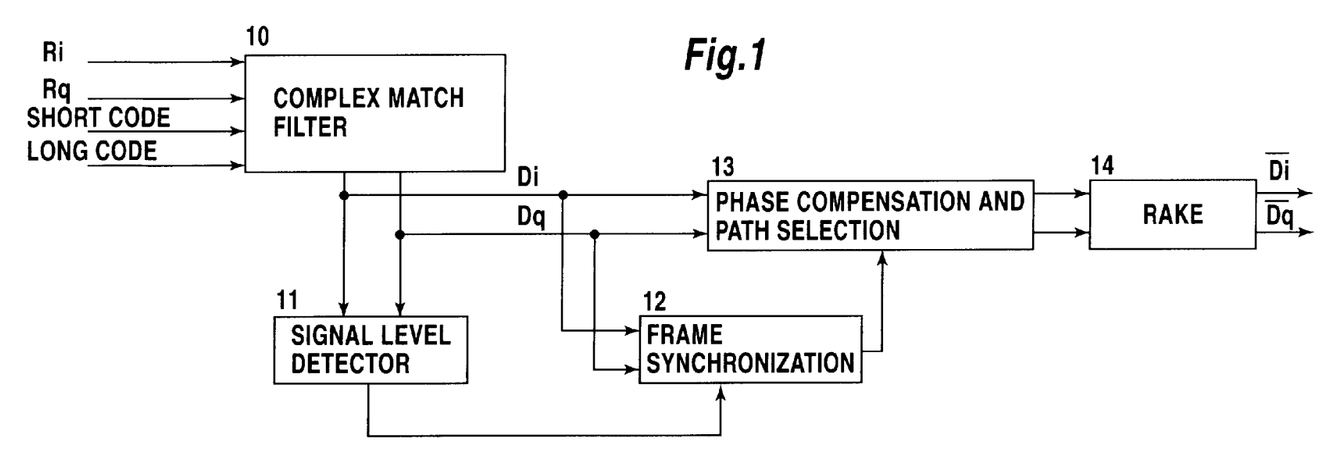
FIG. 1 is a block diagram of an embodiment of a signal reception apparatus according to the present invention.

FIG. 1 is a block diagram of an embodiment of a signal reception apparatus of DS CDMA communication system. The signal reception apparatus has a complex matched filter 10 for calculating a correlation of a sampled components RI and RQ of a received signal after a quadrature detection and replica of the spreading code including a long code and a short code, and for outputting a despread in-phase component $D_i$ (I-component) and a despread Quadrature component $D_q$ (Q-component). The sampling rate of the received signal is equal to chip rate or an integer times, for example twice, of the chip rate.

The complex matched filter 10 is similar to that in the conventional system in FIG. 7(*b*). Any types of matched filters can be applied, for example, a matched filter by a digital signal processor (DSP) or other digital circuits and a matched filter of a surface acoustic wave (SAW). An analog matched filter proposed in Japanese Patent Publication before Examination Hei09-083486 by the inventors of the present invention is much more advantageous than the digital matched filter because the digital matched filter needs an A/D converter for inputting the received signal to the matched filter and a lot of power consumption. The analog matched filter is also high speed and high accuracy.

The correlation outputs $D_i$ and $D_q$ are input to a signal level detector 11 for calculating a power of the correlation output and for outputting the power to a frame synchronization portion 12. The frame synchronization portion 12 calculates a mean value of the power of a plurality of symbols and extracts a path with maximal power. Then pilot symbol of the extracted path is compared with a predetermined pattern. When the pilot symbol is identical with the pattern, the portion 12 outputs a frame synchronization signal. The judgment of the identification of the pilot symbol is performed by a matched filter or by delay differential detection.

The correlation output $D_i$ and $D_q$ are also input to a portion 13 for phase compensation and path selection which compensates the phase of information symbol by using the phase error calculated from pilot symbols. Power of each path is calculated from the phase compensated signal for multi-path selection.

The received signal after phase compensation is input to a rake combiner 14 for synchronizing the multi-path signal and combining them so as to output combined outputs of I- and Q-components Dibar and Dqbar. These components are demodulated into an information symbol in a decision circuit.

Figure 2:
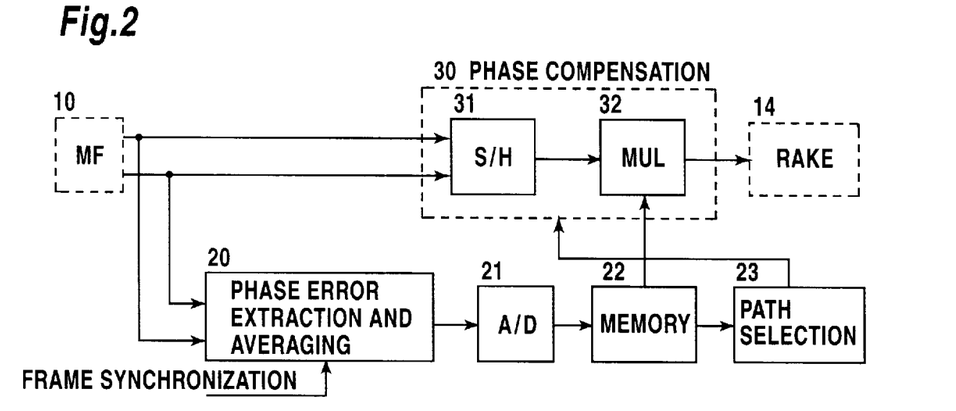
FIG. 2 is a block diagram of the first embodiment of a portion for phase compensation and path selection in the embodiment.

FIG. 2 shows the first embodiment of the portion 13 for phase compensation and path selection having a means 20 for phase error extraction and averaging which extracts a phase error from the pilot symbol and averages the phase error in order to calculate a phase compensation signal. The phase compensation signal is input to a phase compensation means 30 for compensating the despread information symbol according to the phase compensation signal. The phase compensation means 30 consists of a sampling and holding circuit 31 and a multiplication circuit 32. The averaged phase error $M_i$ and $M_q$ shown in the formulae (5) and (6), that is, the phase compensation signal of the pilot symbol in one slot of each path is converted into a digital data for example of 8 bit by an A/D converter 21. The digital data are stored in a memory 22 and are averaged according to the formulae (15) and (16) for a plurality of slots and a power level is calculated from the averaged data of each path in a path selection portion 23. In the formulae (15) and (16), T is a total number of slots for averaging and (ⁿ) is a serial number of slots. The portion 23 compares the power with a predetermined threshold level so as to select a plurality of paths higher than the threshold level.

The despread information symbol output from the matched filter 10 is held by the sampling and holding circuit 31. In the multiplication circuit, the held information symbol is multiplied by the phase compensation signal stored in the memory 22. An output of the multiplication circuit 32 includes despread information symbol of each path after phase compensation which is input to a rake combiner for synchronizing and adding the information symbol for a path diversity.

The matched filter 10 receives the received signal sampled on every the chip period for single sampling. However, the double sampling or higher order over sampling can be realized by similar circuits.

As the multiplication circuit 32, a analog-digital multiplication circuit can be applied, for example shown in Japanese Patent Publication Hei 06-162230 and Hei 06-215164.

The despread signal at the timing of the pilot symbol block is input to the portion 20 according to the frame synchronization signal. The phase error is calculated according to the formula (2) included in the despread pilot symbol. The phase error is averaged over the pilot symbols within one pilot symbol block for each path.

According to the averaged phase compensation signal $Y_i$ and $Y_q$ for T slots calculated by the formulae (15) and (16), a power level of the received signal is calculated from the formula (17). Here, $Y=Y_i+jY_q$.

$$Y_i = \frac{1}{T}\sum_{n=1}^{r} M_i(n) \tag{15}$$

$$Y_q = \frac{1}{T}\sum_{n=1}^{r} M_q(n) \tag{16}$$

$$|Y| = \sqrt{Y_i^2 + Y_q^2} \cong \max(|Y_i|, |Y_q|) + \frac{3}{8}\min(|Y_i|, |Y_q|) \tag{17}$$

A plurality of paths of predetermined number of L of higher averaged power |Y| are selected from the path of the maximal power.

Since the phase compensation signals $M_i(n)$ and $M_q(n)$ for each slot are averaged, noise component and interference component are also averaged. The influence of the cross correlation and interference is reduced. The cross correlation of a long code in the composite code system causes random outputs for each symbol. This randomness will help to reduce the cross correlation interference by the averaging The A/D converter 21, the sampling and holding circuit 31 and multiplication circuit 32 work at chip rate clock.

Figure 3:
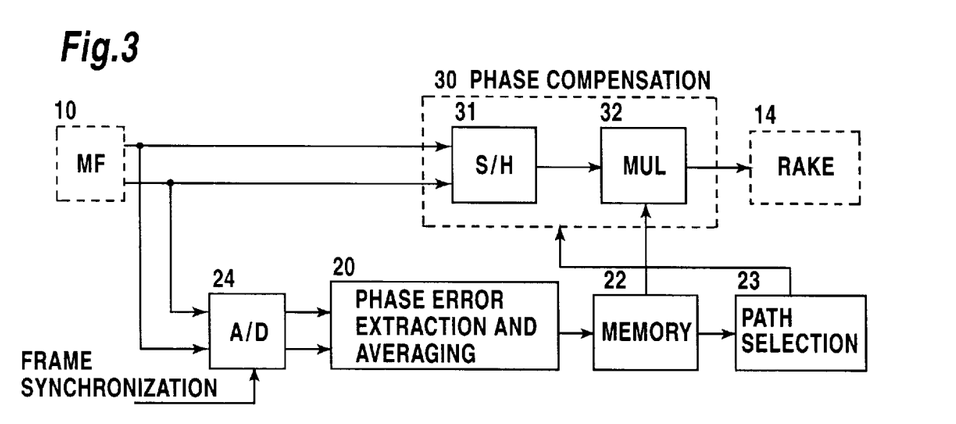
FIG. 3 is a block diagram of the second embodiment of a portion for phase compensation and path selection in the embodiment.

FIG. 3 shows the second embodiment of the portion 13 for phase compensation and path selection in which the means 20 for phase error extraction and averaging is a digital circuit. An A/D converter 24 is connected between the matched filter 10 and the means 20, for converting the despread signal corresponding to the pilot symbol block into a digital data of a predetermined bits, for example 8 bit. The means 20 calculates $M_i$ and $M_q$ by a digital circuit. Other portions are similar to those in FIG. 2.

Figure 4:
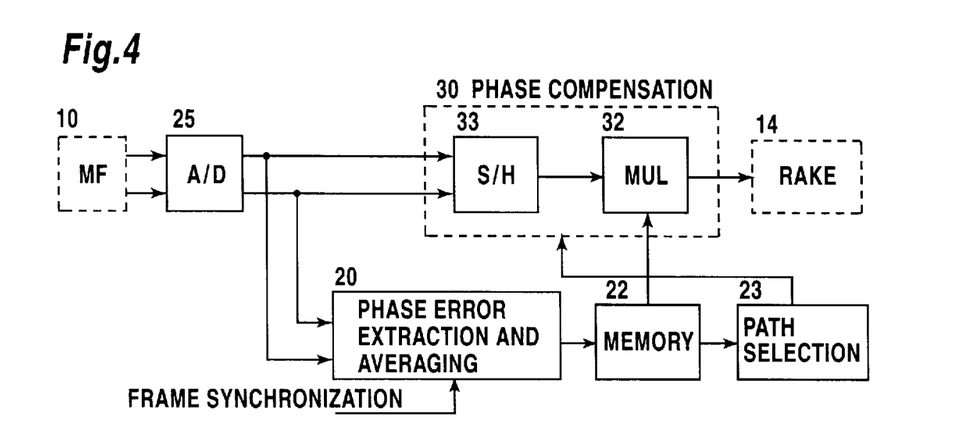
FIG. 4 is a block diagram the third embodiment of a portion for phase compensation and path selection in the embodiment.

FIG. 4 shows the third embodiment of the portion 13 for phase compensation and path selection in which the multiplication circuit 32 is a digital circuit. An A/D converter 25 is connected to the matched filter 10 for converting the output of the matched filter 10 into a digital data of a predetermined bits. The digital data is input to the means 20 and 30. The means 30 consists of the multiplication circuit 32 and a memory 33 as a buffer of the digital data. Other portions are similar to those in FIG. 2.

Figure 5:
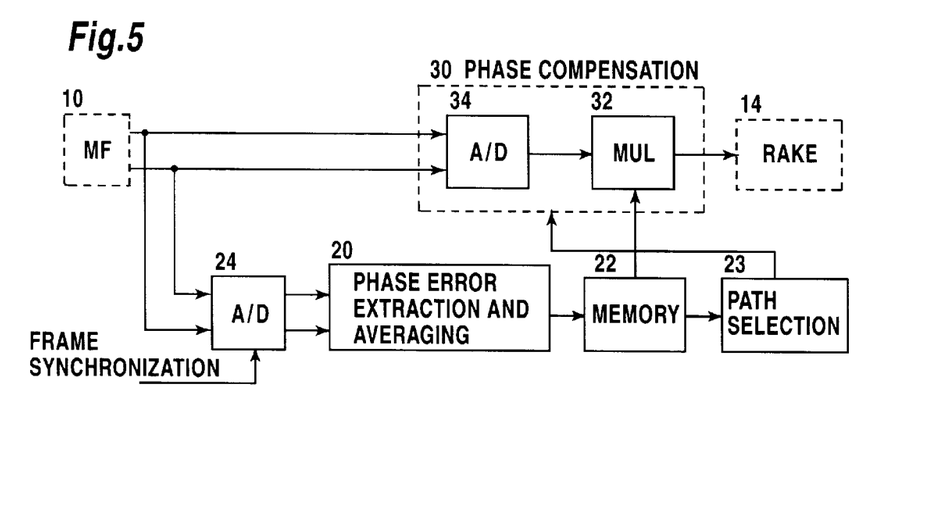
FIG. 5 is a block diagram the fourth embodiment of a portion for phase compensation and path selection in the embodiment.

FIG. 5 shows the fourth embodiment of the portion 13 for phase compensation and path selection in which the sampling and holding circuit 31 of the third embodiment (FIG. 3) is substituted by an A/D converter 34. The multiplication circuit 32 is a digital circuit. Other portions are similar to those in FIG. 2.

When the matched filter 10 is a digital matched filter, the A/D converter 25 can be omitted in FIG. 4.

Figure 6:
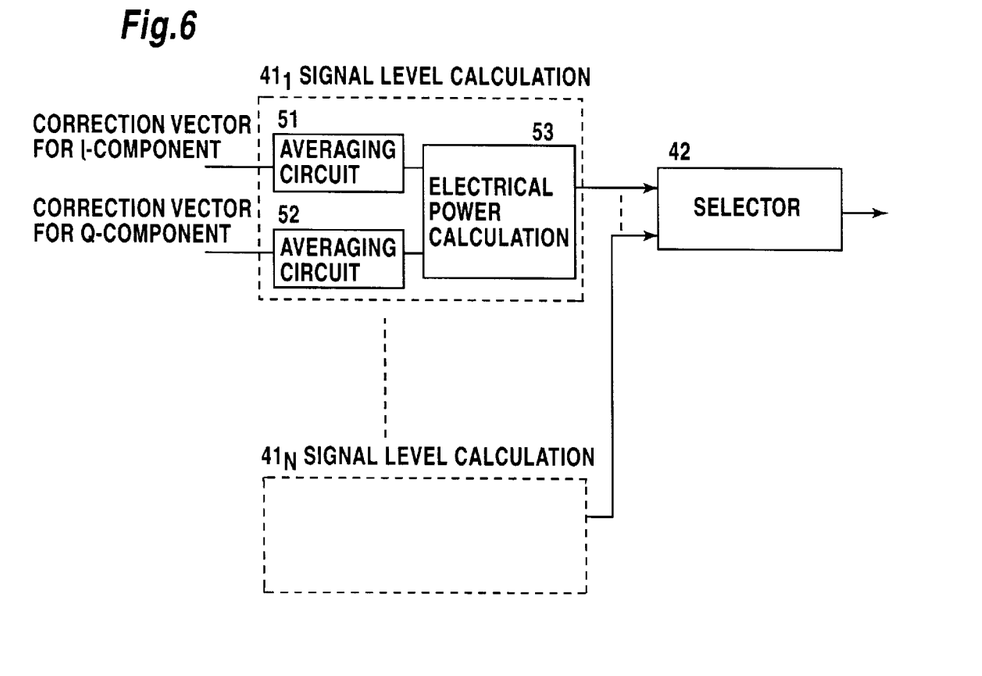
FIG. 6 is a block diagram a path selection portion in the embodiment.

FIG. 6 shows the path selection portion 23 having a plurality of received signal level calculation portions $41_1$ to $41_N$ corresponding to paths candidates. Here, N is a multiplication result of the number of chips multiplied by order of the over smapling. When one symbol is 128 chips and the over sampling is double sampling, N–128×2–256. The calculation circuit 411 has averaging circuits 51 and 52 for I- and Q-components $M_i$ and $M_q$, respectively. Each of the averaging circuits calculates an average value of the phase compensation signal for a plurality of slots as shown in the formulae (15) and (16). The averaged phase compensation signals are input to an electrical power calculation portion 53 for calculating the average power |Y| of the received signal as shown in the formula (17). The portions 412 to 41N are similar to 411 and the description thereof is omitted.

The average power |Y| at each chip timing is input to a selector 42 for selecting at most L (predetermined number) of paths of higher power from the maximal power. The timing signal for these paths are input to the phase compensation means 30.

As mentioned above, the digital phase compensation signal is input from the memory 22 to the path selection portion 23 according to the present invention. The circuit size is diminished because the A/D converter for the path selection in the conventional receiver can be omitted. The path selection portion works synchronously to reception timing of the pilot symbol block and can be stopped during the information blocks timing. The electrical power consumption can de decreased.

What is claimed is:

1. A signal reception apparatus for DS CDMA communication system for receiving a signal of a series frames, each said frame comprising a plurality of slots, each said slot comprising a pilot symbol block and a information symbol block, each said pilot symbol block comprising a plurality of symbols, each said information symbol block comprising a plurality of symbols, said signal reception apparatus comprising:

a matched filter for despreading said signal and for outputting a despread signal;

a signal level detection portion for detecting a level of said despread signal;

a frame synchronization detection portion for detecting a frame synchronizing according to said pilot symbol in said despread signal, a phase compensation and path selection port for calculating a phase compensation signal from said pilot symbol in said received signal, for compensating said information symbol of despread signal in phase according to said phase compensation signal, for selecting paths to be received according to an electrical power of said phase compensation signal and for outputting a compensated signals of said selected paths; and a rake combiner for synchronizing said compensated signals of said selected paths and for combining and signals.

2. A signal reception apparatus for DS-CDMA communication system as claimed in claim 1, said phase compensation and path selection portion comprising:

a phase error extraction and averaging means for extracting a phase error of said pilot symbol of said despread signal, for averaging and phase error and for outputting said average as a phase compensation signal;

an A/D converter for converting said phase compensation signal into a digital phase compensation signal;

a memory for storing said digital phase compensation signal;

a path selection portion for calculating an average of said digital signal in said memory, for calculating an electrical power of said received signal from said average of said digital signal of a plurality of slots and for selecting paths to be received according to said electrical power;

a sampling and holding circuit for holding said information symbol in said despread signal output from said matched filter; and a multiplier for multiplying said information symbol in said sampling and holding circuit by said digital phase compensation signal.

3. A signal reception apparatus for DS-CDMA communication system as claimed in claim 1, said phase compensation and path selection portion comprising:

an A/D converter for converting said pilot symbol in said despread signal output from said matched filter into a digital pilot symbol;

a phase error extraction and averaging means for extracting a phase error of said digital pilot symbol of said despread signal, for averaging said phase error and for outputting said average as a phase compensation signal;

a memory for storing and phase compensation signal;

a path selection portion for calculating an average of said phase compensation signal in said memory, for calculating an electrical power of said received signal from said average of said phase compensation signal of a plurality of slots and for selecting paths to be received according to said electrical power;

a sampling and holding circuit for holding said information symbol in said despread signal output from said matched filter; and a multiplier for multiplying said information symbol in said sampling and holding circuit by said phase compensation signal.

4. A signal reception apparatus for DS-CDMA communication system as claimed in claim 1, said phase compensation and path selection portion comprising:

an A/D converter for converting said despread signal output from said matched filter into a digital despread symbol;

a phase error extraction and averaging means for extracting a phase error of said pilot symbol of said digital despread signal, for averaging said phase error and for outputting said average as a phase compensation signal;

a memory for storing said phase compensation signal;

a path selection portion for calculating an electrical power of said received signal from said average of said phase compensating signal of a plurality of slots and for selecting paths to be received according to said electrical power; and a multiplier for multiplying said information symbol in said digital despread signal by said phase compensation signal in said memory.

5. A signal reception apparatus for DS-CDMA communication system as claimed in claim 1, said phase compensation and path selection portion comprising:

a first A/D converter for converting said pilot symbol in said despread signal output from said matched filter into a digital pilot symbol;

a phase error extraction and averaging means for extracting a phase error of said digital pilot symbol, for averaging said phase error and for outputting said average as a phase compensation signal;

a memory for storing said phase compensation signal;

a path selection portion for calculating an electrical power of said received signal from said average of said phase compensation signal of a plurality of slots and for selecting paths to be received according to said electrical power;

a second A/D converter for converting said information symbol in said despread signal output from said matched filter into a digital information symbol; and a multiplier for multiplying said digital information symbol in said despread signal by said phase compensation signal in said memory.

6. A signal reception apparatus for DS-CDMA communication system as claimed in claim 1, wherein said phase compensation and path selection portion works only in periods of said pilot symbol and otherwise stops working, whereby electrical power consumption is decreased.

* * * * *